Aug. 11, 1970  D. ROSENBERG  3,523,408

GAS SEPARATOR

Filed April 2, 1968  2 Sheets-Sheet 1

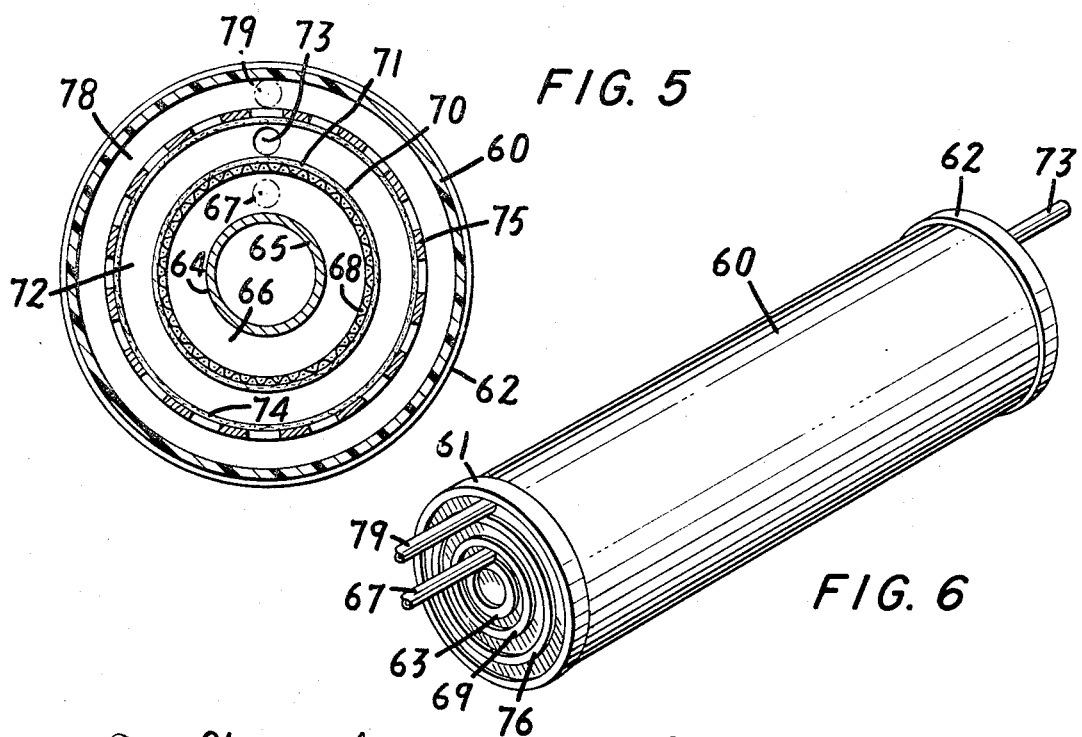
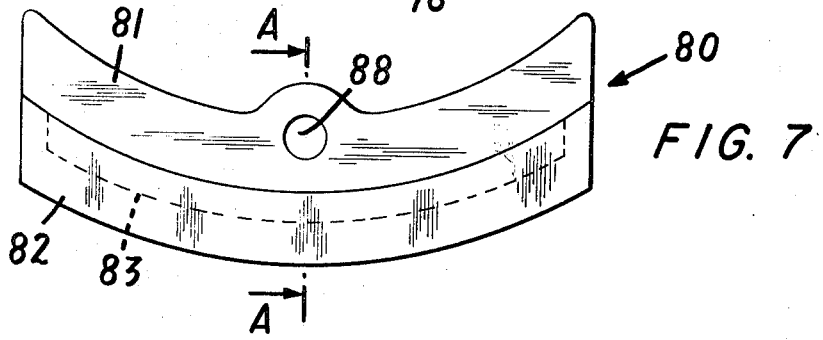
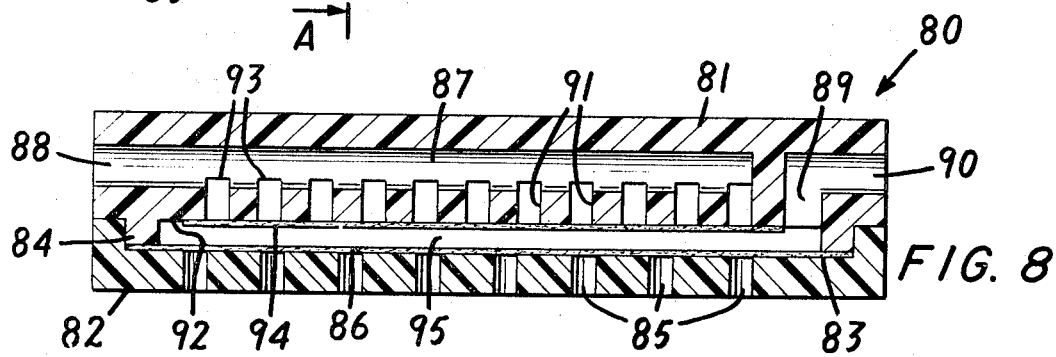
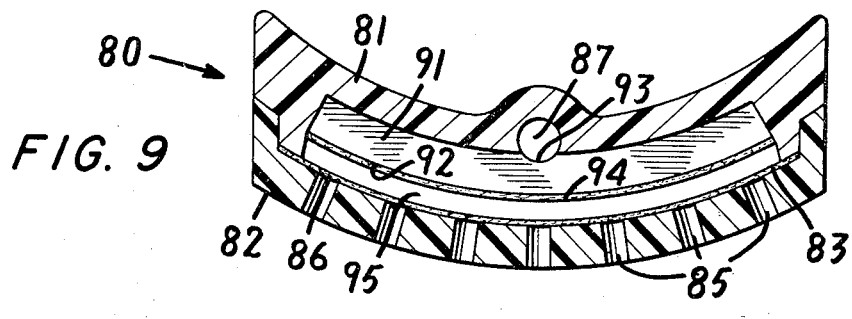

United States Patent Office 3,523,408
Patented Aug. 11, 1970

3,523,408
GAS SEPARATOR
David Rosenberg, Glen Cove, N.Y., assignor to Pall Corporation, Glen Cove, N.Y., a corporation of New York
Filed Apr. 2, 1968, Ser. No. 718,088
Int. Cl. B01d 19/00
U.S. Cl. 55—159                           22 Claims

ABSTRACT OF THE DISCLOSURE

A gas separator is provided capable of separating gases and liquids, and especially, of removing and venting gases contained in liquids. The separator is based on a combination of two filters, one of which is wetted by the liquid, and one of which is liquid repellent. The liquid-wetted filter passes the liquid, and the liquid-repellent filter passes the gas.

---

This invention provides a gas separator that is capable of separating gases and liquids, and, more particularly, for separating and venting of gases from liquids, and comprising a combination of two filters, one of which is wetted by and passes the liquid, and is gas-repellent when saturated with liquid, and the other of which is liquid-repellent, and is capable of passing the gas, so that only liquid passes through the liquid-wetted filter, and only gas passes through the liquid-repellent filter.

The entrainment of gases in liquids and of liquids in gases are common phenomena in many chemical processes, involving gases and liquids as reactants and/or as reaction products. Such mixtures frequently must be separated by some mechanical device, especially when emulsification occurs, because of the slowness of gravity separation of the mixture. Centrifugal and vortex separators can be used for this purpose, and other types of mechanical devices are available. These, however, are bulky, and not always practical to use.

Frequently, it is necessary to separate the gas from the liquid with absolute assurance that no entrained gas will remain with the liquid. When liquids are injected into a patient, for example, in various types of medical treatment, air cannot be injected concurrently without the danger of an embolism, with possibly fatal consequences. In many medicinal injections, it is generally customary to clear the line of air before injecting the liquid, but the problem of air entering the line thereafter and being injected with the liquid cannot be entirely foreclosed, particularly when the liquid is injected under pressure, as by a mechanical pump. A further problem is the possibility of injection of air into the patient after the supply of liquid has been exhausted. In all of these cases, it is necessary that a device be used that will prevent such air from reaching the patient, and for this purpose cumbersome mechanical devices such as centrifuges and vortex separators are not practical.

It is known that porous materials of a small pore size when wetted by a liquid are incapable of passing gases at fluid pressures below the so-called "bubble point" of the material. The bubble point is defined as the characteristic pressure at which the first bubble of air appears, when such a material is pressurized with air while immersed just under the surface of a liquid. The bubble point effect is well known from U.S. Pat. No. 3,007,334, dated Nov. 7, 1961. In fact, the method and apparatus according to that patent make it possible to determine the maximum pore size of filter elements from the pressures at the bubble point, since these pressures are directly correlated with the pore size of the filter.

It has been proposed that this phenomenon be employed to prevent the passage of air to patients, by insertion in the fluid line leading to the patient of a microporous filter material which is preferentially wetted by the liquid being administered. Such a device when saturated with liquid will not permit the passage of air to the patient, so long as the fluid pressure is below the bubble point of the filter. However, the problem with such devices is that although they block the passage of air, they do not vent it, with the result that the air held back by the filter can cover the surface of the filter, restricting flow, or even blocking it, if the surface is completely covered, and increasing the pressure drop across the filter, with the result that the bubble point of the filter element can be reached sooner than expected, after which the blocked air will pass through, virtually all at once. Furthermore, the presence of this type of filter in the line makes it difficult if not impossible to clear the line of air once the filter has been wetted, which means that after the line has been used, it must be thoroughly dried out so as to dry the filter, before it can be cleared of air for the next use. This drying procedure is not always feasible, however, particularly where filters must be steamed, sterilized, or hot-water sanitized before use, and are therefore wetted completely before use.

Similar problems arise in chemical processes, where a liquid during transfer from one batch tank to another must be filtered. Air can be drawn into the filter housing at the end of each batch transfer, and this air must be vented before the next transfer. However, this can hardly be done through a liquid-wet or saturated filter having a high bubble point.

The problem is particularly troublesome with microporous filter materials having pores of less than one micron in diameter. Such filters are intended to filter out harmful micro-organisms from fluids, but in such filters the pressure differential needed to force air through a filter wetted with a liquid can be as high as 30 p.s.i.d., as a result of which complete filter blockage can result from the presence of air in sufficient quantity in the system to cover the surface of the filter.

It is possible to avoid these difficulties to a certain extent by the use of filter materials that contain both hydrophobic and hydrophilic portions. The hydrophilic portions will pass the water, and the hydrophobic portions will not be wetted by water, and will therefore remain open for passage of gas therethrough. Such filters will pass air and other gases, but of course they cannot be used in medical applications or other applications to separate air or gas from the liquid.

In accordance with the instant invention, a gas separator is provided that is capable of separating gases and liquids and of venting the gas. In this way, blockage of the system by the buildup of a gas lock is avoided, while at the same time the entrained gas is entirely eliminated from the liquid. Thus, the device of the invention is particularly adapted for medicinal applications, where air must be vented from the line, and must also be absolutely prevented from reaching a patient receiving an injection of the fluid. It is also applicable in chemical processes and like processes where mixtures of gases and liquids must be fully separated from each other. In a preferred embodiment, the device also is capable of removing harmful micro-organisms, so that the liquids and/or gases passing through the device are sterilized at the same time.

The gas separator in accordance with the invention comprises, in combination, a housing; a chamber in the housing of which chamber one wall comprises a filter material that is wetted by a liquid to be passed through the housing, and another wall comprises a filter material that is not wetted by the liquid passing through the housing, but in fact is liquid-repellent; an inlet in the housing for delivering fluid comprising gas and liquid to the chamber between the liquid-wetted and liquid-repellent filter materials; a liquid outlet in the housing on the opposite side of the liquid-wetted material; and a gas outlet in the housing on the opposite side of the liquid-repellent material. Both the liquid-wetted and the liquid-repellent materials preferably have a pore size less than about 0.3 micron, at which harmful micro-organisms cannot pass therethrough. The housing and associated parts of the separator are preferably made of plastic, and are bonded or fused together in a one piece construction.

The attached drawings show preferred embodiments of the invention.

FIG. 5 is a cross-sectional view of another embodiment in which the liquid-repellent and liquid-wetted filter materials are arranged concentrically;

FIG. 6 is a perspective view of the separator of FIG. 5;

FIG. 7 is an end view of another embodiment of gas separator of the invention;

FIG. 8 is a longitudinal sectional view of the separator of FIG. 7 taken along the lines A—A of FIG. 7, and looking in the direction of the arrows; and FIG. 9 is a cross-sectional view of the separator of FIG. 7.

Figure 1:
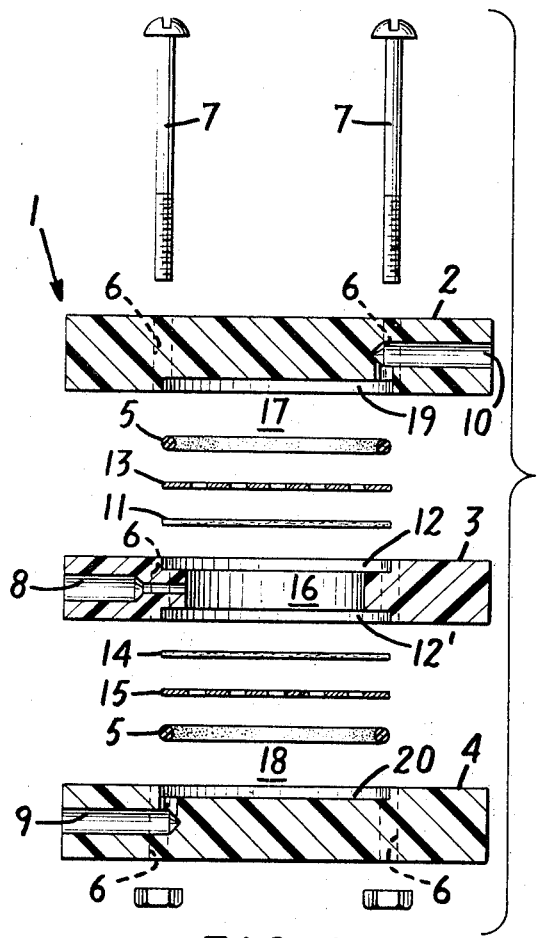
FIG. 1 represents an exploded view of one type of gas separator in accordance with the invention, in which the liquid-wetted and liquid-repellent filter materials are at opposite sides of the chamber.

The gas separator of the invention is quite versatile, and the construction design is such that it can be adapted to meet any gas-liquid separation requirements. The essential materials of which it is constructed are known, and available, and readily lend themselves to the construction of devices of any desired size. For medical applications, it is usually preferable that the separator chamber between the two filter materials have as small a fluid volume as possible, less than 1 cc., and preferably less than 0.5 cc., whereas in chemical processes, not only small but also rather large devices can be employed, having volumes up to 1000 liters, or more, particularly when production of large volumes of materials is necessary. The relative proportion of available surface area for the liquid-wetted and liquid-repellent materials can be adjusted as required, and will depend upon the relative volumes of fluid being processed, and of liquids and gases being passed therethrough.

Because of the desirability of preventing distortion, and for greater strength and resistance to rupture, in most applications the housing is preferably of a rigid construction, using rigid sheets or molded or cast plastic parts, or metal, thus making it possible for the device to resist internal fluid pressures up to the bubble point of the filters used. If high fluid pressures are not to be encountered, however, the housing can be of a flexible construction, in which case it can be made of flexible sheet material, such as polyvinyl chloride, vinyl chloride-vinylidene chloride copolymers, polyesters, polyethylene or polypropylene sheet.

It is frequently helpful that the housing be transparent, so that the functioning of the device and the condition of the liquid-repellent and liquid-wetted filter materials can be observed, without dismantling the separator, inasmuch as these materials also serve as filters, and will remove suspended solid material, such as dirt and other contaminants, which can lead to blockage. However, the device is not designed with a high dirt capacity in mind, since its primary purpose is gas and liquid separation, and if large quantities of suspended matter can be present in the fluid, it will be preferable to precede the gas separator in the line by a filter of conventional construction and relatively high dirt capacity, so as to prevent unnecessary plugging of the separator. If the separator is to have a filtering function as well, it is best that this function be limited to that of a clean-up or polishing filter, such as a filter primarily designed for bacteria removal, downline from a high dirt capacity filter, capable of removing larger size contaminants.

Thus, for example, the housing can be constructed of rigid plastic material that is also transparent, such as polyethylene, polymethyl methacrylate, polymethyl acrylate, polymethyl pentene-1, polyvinyl chloride, and vinyl chloride-vinylidene chloride copolymers. Translucent materials, such as polypropylene, polyethylene, urea-formaldehyde, and melamine-formaldehyde polymers, can also be employed. Other plastic materials that are particularly suitable are polystyrene, polyamides, polytetrafluoroethylene, polyfluorotrichloroethylene, polycarbonates, polyesters, phenol-formaldehyde resins, polyvinyl butyral, cellulose acetate, cellulose acetate propionate, ethyl cellulose and polyoxymethylene resins.

Metal housings can be used. Suitable metals include stainless steel, aluminum, and stainless alloys, such as nickel, chromium, vanadium, molybdenum, and manganese alloys. The housing material should, of course, be inert to the fluids being processed.

The filter materials, of which one is liquid-repellent and one is wetted preferentially by the liquid, can have any desired pore size, according to the nature of the fluid being treated, and the nature of the contaminants, if any, to be removed. Since most filter materials are wetted by some liquids, and repel others, the materials chosen for each filter will depend upon the fluid being processed. If water is the liquid, then one of the filter materials is hydrophilic, and the other hydrophobic.

In order to be effective in repelling and therefore not passing a gas, the liquid-wetted filter material should have a pore size of less than about 100 microns, and preferably less than 15 microns. In order to be effective in repelling and therefore not passing a liquid, the liquid-repellant filter material likewise should have a pore size of less than about 100 microns, and preferably less than about 15 microns. For bacteria removal purposes, as previously indicated, the pore size should be less than about 0.3 micron, and preferably less than 0.2 micron. A filter material that has too large a pore size can have the pore size reduced by impregnation, or coating, or both, with particulate and/or fibrous material. Such materials and procedures are known.

Thus, there can be used as the filter material woven or nonwoven textile materials made of cotton, jute, sisal, hemp, flax, linen, wood fiber, metal wire, such as stainless steel, copper and aluminum, plastic filaments (monofilaments and yarn) such as nylon, polyvinyl chloride, polyacrylonitrile, esters of terephthalic acid and ethylene glycol, cuprammonium rayon, acetate, rayon, viscose rayon and polyvinylidene chloride; sintered composites made from metal powder or particles, such as stainless steel, copper, bronze, or Monel, or from plastic particles, such as polyvinyl chloride, nylon, polyethylene, polypropylene, polytetrafluoroethylene, and polyfluorotrichloroethylene; glass and ceramic materials; papers of various types, made up of cellulose fibers, cellulose cloth, plastic fibers, such as polyvinyl chloride, cellulose acetate, polyvinylidene chloride, nylon, and any of the other plastic filaments mentioned above, taken singly or in any combination; and microporous sheets, such as sythetic resin and cellulose derivative membrane filters.

Impregnated and/or coated microporous filter sheet materials meeting these general requirements and that in particular can be made with less than 0.3 micron pores and thus are useful for the removal of harmful micro-organisms include the microporous materials of U.S. Pats. Nos. 3,158,532 to Pall et al., dated Nov. 24, 1964, 3,238,-056, to Pall et al., dated Mar. 1, 1966, 3,246,767 to Pall et al., dated Apr. 19, 1966, and 3,353,682 to Pall et al., dated Nov. 21, 1967. Also useful for this purpose are microporous ceramic filters and the microporous membrane filters described in U.S. Pats. Nos. 1,421,341 to Zsigmondy, 1,693,890 and 1,720,670 to Duclaux, 2,783,894 to Dovell, 2,864,777 to Robinson, and 2,944,017 to Cotton.

Liquid repellency is obtained, if the filter is of a material that is wetted by the liquid, by treatment with a material that repels the liquid when disposed on the surfaces of the pore walls of the filter material. The repellent material can be applied from a solution or dispersion thereof, in a solvent or dispersant which desirably includes a binder, to retain the repellent on the pore wall surfaces, unless the repellent is reactive therewith, and can bond itself thereto.

The application can be by printing, spraying, coating, impregnating, dipping, or by exposure to a vapor, such as that of a low boiling silicone compound. It is necessary to use a technique that results in thorough treatment of the entire length of the pores, from surface to surface of the filter material. This requires impregnation of the wall surfaces of the pores from end to end, best achieved by allowing the solution or dispersion of the repellent to flow into and through the pores in the treated zone, by capillarity or by pressure application.

It will be appreciated that in nonwoven substrates, such as paper, nonwoven bats, and microporous layers formed by laydown from a fluid dispersion, the through pores that extend from one surface to another are composed of interconnected pores which are the interstices betwen the particulate material of which the material is made.

The amount of repellent that is required depends upon the effectiveness of the material as a repellent, and the volume of pores being treated. Usually less than 25% by weight of the volume being treated and preferably from 0.025% to 15% by weight of the volume is sufficient.

The repellent is chosen according to the liquid suspending medium being filtered. It must repel such liquid, or be rendered so in situ on the pore surface.

For a hydrophobic or water-repellent surface, there can be used silicone resins and silicone oils of the general type $R_n$-Si-O-Si-$R_n$, where $n$ is 1 or 2. $n$ is 1 in the case of the fluids, and $n$ is 2 in the case of the solids, which contain cross-links between chains. Mixtures containing species in which $n$ is from 1 to 3 can also be used. R is a hydrocarbon group having from one to eighteen carbon atoms.

Also useful are the quaternary ammonium salt derivatives of silicone compounds described in U.S. Pat. No. 2,738,290, dated Mar. 13, 1956. These are substantive to cellulosic filter materials, as noted in the patent. Also, the hydrophobic oils and waxes can be used, in appropriate circumstances, where they can be made permanent.

If the filter material is liquid repellent, and it is desired to make it liquid-wetting, it is advantageous to apply a liquid-wetted material thereto. The same treatment principles and proportions apply to liquid-wetted materials as to liquid-repellent materials. Typical wetting agents that are suitable are polyvinyl alcohol, alkyl aryl polyether alcohols, melamine formaldehyde resins, and the like. These wetting agents can be applied from a dispersion or emulsion.

The filter material that is liquid-repellent and therefore passes the gas being separated from the liquid is so placed in the housing that the gas can reach it and pass through it to the gas outlet in the housing. Inasmuch as gases normally rise, this means that at least a part of the liquid-repellent filter preferably is at an upper portion or wall of the chamber in the housing. If the liquid-repellent filter is confined to a lower portion of the housing, the air or the gas may not pass through it until an air pocket deep enough to reach the uppermost portion of the liquid-repellent filter has built up in the chamber. The building up of such a gas pocket is not a disadvantage, if the liquid-wetted filter material is still fully open to the passage of fluid, and is not covered by or immersed in the air or other gas pocket, but such a device may be position-sensitive. It is therefore less preferred, for some uses.

For convenience of construction and minimum volume, in the gas separator of the invention the liquid-repellent and liquid-wetted filter materials are substantially parallel, are as close together as is practical and still define a space therebetween that is open to the gas-liquid mixture to be separated, and define opposed parallel walls of the housing chamber. A suitable spacing of the filters is from 0.25 mm. to about 5 mm., for medicinal uses, as an air separator in a supply line to a patient. For other purposes, there is no limit except that dictated by the dimensions and flow requirements of the system in which it is to be placed.

In the simplest construction, the separator walls are straight, as well as parallel. However, in this case the liquid-repellent wall normally must be uppermost, if gas blockage is to be avoided.

Another type of construction, which avoids the possibility of gas blockage in the chamber, regardless of the position of the device, has the liquid-repellent and liquid-wetted separator walls arranged in parallel in a U configuration, with the gas being vented either on the exterior or the interior walls of the U. In either case, regardless of the position of the device, a portion of the liquid-repellent wall is always uppermost in the device, so that gas can reach it and thus be vented, even if other portions of the same liquid-repellent wall be immersed in liquid.

It is also possible to arrange the liquid-repellent and liquid-wetted walls in an N, a V or even a W configuration, with similar results. One of the filter materials can cross the chamber diagonally or at an angle to the other filter material comprising another wall thereof, and can if desired contact the latter at one end in an S or Z configuration.

The liquid-repellent and/or liquid-wetted materials can also be arranged in a corrugated or undulating configuration, or in a raised, waffled or dimpled pattern for a greater surface area in a small space. In this case, the surface of the filters is uneven, so that gas blockage due to gas pockets is unlikely, since the gas will not be in contact with all portions of the filter. If the raised portions of either the liquid-repellent or the liquid-wetted filter material are virtually in contact with the other, the depressed portions then provide space for passage of liquid therebetween, while the close spacing of the abutting raised portions ensures that gas can reach and escape through the liquid-repellent filter, whatever the position of the device. Thus, this also avoids position-sensitivity, as do the N, S, U, V, W and Z configurations.

For simplicity of construction, the housing is best formed in two or three matching pieces, which when assembled define the separator chamber therebetween, with the liquid-repellent filter material fixed in one portion of the housing, and the liquid-wetted filter material fixed in the other portion of the housing, at opposite sides of the chamber, and preferably parallel or nearly parallel to each other in the final assembly. These parts can be separately molded, and then attached together, by bolts, or by heat-fusing, or by solvent- or adhesive-bonding. In the case of plastic materials, solvent-bonding is a preferred attachment technique, because it eliminates the presence of extraneous adhesives, does not affect transparency at the joints of a transparent housing, and is also leakproof.

The housing parts are constructed so that the filter materials contained therein are spaced from the outer walls thereof, and define spaces therebetween. The housing part containing the liquid-repellent material has a gas outlet or vent communicating with the space on the outside of the liquid-repellent material, and the housing part containing the liquid-wetted material has a liquid outlet or vent communicating with the space on the outside of the liquid-wetted material. The housing thus has at least three chambers, the intermediate chamber being that to which the fluid containing both gas and liquid is delivered for separation of the gas therefrom, and two outer chambers on opposite sides of the liquid-repellent and liquid-wetted materials, respectively, being adapted to vent gas separated from the liquid, and to deliver liquid from which gas has been separated.

The devices shown in the drawings illustrate three embodiments of this type of construction.

Figure 2:
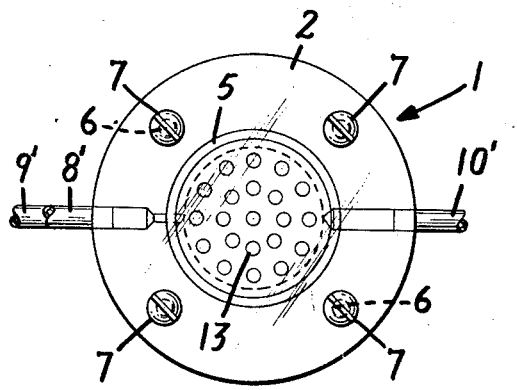
FIG. 2 is a top plan view of the separator of FIG. 1 in assembled form.

The separator of FIGS. 1 and 2 comprises a rigid round transparent polymethyl methacrylate box housing 1 formed in three parts, an upper portion 2, a central ring 3, and a lower portion 4, between which are fitted O-rings 5. These housing portions have thick side walls, with four through bores 6, through which pass bolts 7, so that the three housing portions are held together in one piece.

Each housing portion is of a molded construction. Molded as an integral part of the central ring 3 is a fluid feed inlet 8 and line 8', and the lower portion is provided with a liquid outlet 9 and line 9'. For the same purpose, the top of the separator portion 2 is provided with a fluid outlet 10 and line 10', which serve as a gas vent, but holes can also be provided, if the gas is not to be captured and recycled or used.

A disk 11 of liquid-repellent or hydrophobic filter material, 0.1 average pore diameter, is held in the bite between the ledge 12 of the housing portion 3, and the perforated support member 13, made of polypropylene sheet, with $\frac{1}{16}$ inch holes on 0.1 inch centers. A disk 14 of liquid-wetted or hydrophilic filter material is held in the bite between the ledge 12' of housing portion 3 and the perforated support member 15 of the same material as the member 13. The central housing portion 3 thus serves as a spacer ring, which fits between the portions 2 and 4 of the housing, supporting the liquid-repellent and liquid-wetted filter materials 11 and 14, and the span between ledges 12 and 12' thereof determines the width of the space or chamber 16 therebetween. This space can for instance be from 0.5 to 4.5 mm. The O-rings 5 assist in maintaining a liquid-tight seal between the filter materials and the housing portions 2, 3, 4. In like manner, the depth of the recess 19 in the housing portion 2 determines the width of the space or chamber 17 between the hydrophobic filter 11, and the top of the housing portion 2, and the depth of the recess 20 in the housing portion 4 determines the width of the space or chamber 18 between the hydrophilic filter 14 and the bottom of the housing portion 4.

The liquid-repellent or hydrophobic filter 11 was prepared as follows:

A microporous filter material in sheet form was prepared, following the procedure of Example I of U.S. Pat. No. 3,353,682. The average pore size was 0.1 micron and the maximum pore less than 0.35 micron as determined by 100% removal of the bacteria, *Serratia marcescens*.

An aqueous fiber dispersion was prepared containing 5.4 g./l. of crocidolite type asbestos fibers having an average diameter of 0.5 micron and an average length of 300 microns and 0.6 g./l. of crocidolite fibers having an average diameter of 0.5 micron and an average length of 1500 microns, by agitation in a high shear mixer having a rotor diameter of 7 inches, at a speed of 1800 r.p.m.

An amyl acetate binder solution was prepared containing 4.75% by weight of neoprene, 0.2% by weight magnesium oxide and 0.24% by weight of zinc oxide, 0.05% by weight of tetraethylthiuram disulfide as a curing agent, 0.05% sodium dibutyl dithiocarbamate as a curing agent, 0.11% by weight of phenyl-β-naphthylamine as a stabilizer, and 94.7% by weight amyl acetate.

This was blended into the fiber slurry at the region of highest shear in a ratio of neoprene to fibers of 15:100. Neoprene was deposited on the fibers, so that the fibers were coated with about 15% by weight neoprene.

A thin cellulose paper having a thickness of 0.0045 inch and a weight of 2.65 g./ft.$^2$ was placed on the foraminous belt of a Fourdrinier machine, and served as the foraminous base support for laydown of the microporous material. The paper was used as the base rather than the mesh, to ensure a smooth-surfaced fine base layer. The paper was stripped from the microporous material after it had been laid down, and before curing.

The dispersion of fibers and binding agent was then flowed upon the paper support, and the resulting turbulence deflocculated some fibers, while some liquid drained out by gravity, thereby forming a thin first microporous layer of deflocculated fibers about 0.001 inch in thickness, of the mixed asbestos fibers, in which the fibers lay almost entirely in planes approximately parallel to the plane of the layer, and having an average pore diameter of 0.1 micron, and a maximum pore diameter of 0.35 micron. The flow through the support slowed as the layer formed, and the fibers in the supernatant liquid reflocculated. The belt was passed under a doctor blade which broke up excessively large flocs in the supernatant dispersion. Thereafter, a vacuum of 15 inches of mercury was applied on the underside of the foraminous belt, causing the supernatant dispersion to flow through the thin layer, depositing the remaining mixed asbestos fibers on the thin layer, under pressure flow, and forming a coarse layer having an average pore diameter of 0.25 micron, a maximum pore diameter of 0.55 micron and a thickness of about 0.004 inch.

The bilayered sheet so formed had a thickness (uncompressed) of 0.006 inch, and was dried under infrared lamps, and then oven-cured for 20 minutes at 310° F. It had a water permeability of 10 gallons per minute per square foot at an applied pressure differential of 15 p.s.i. The voids volume of the relatively coarse layer was found to be about 84%, and for the thin layer, it was 60%.

This material was then treated with General Electric's RTV-112 silicone resin, to render it water-repellent. The treatment was carried out by impregnation using a 5% solution of RTV-112 silicone resin solution in perchloroethylene, followed by evaporation of the solvent, and curing the resin at 40% relative humidity and at 25° C. for 18 hours. The deposition rate was approximately 0.1 cc. of solution per square centimeter of filter material, extending to the opposite side of the material. The dry permeability of the material at 28 cu. ft. per minute of air per square foot was unchanged by the treatment.

The liquid-wetted or hydrophilic filter 14 was the same material, *without* the silicone resin treatment.

In use, fluid containing both gas and liquid enters via line 8 into the chamber 16 between the filter materials 11, 14. Fluid wets the hydrophilic liquid-wetted material 14, and as soon as the pores of this material are filled, gas can no longer pass through. On the other hand, liquid does not wet the liquid-repellent material 11 and gas is consequently free to pass through this material, reaching the chamber 17 on the other side thereof, and being vented to the atmosphere through the vent 10. Liquid passing through the liquid-wetted material 14 enters the chamber 18, whence it is delivered from the device through the outlet 9.

The fluid inlet 8 and liquid outlet 9 are shaped to match any type of fluid line in the system in which the separator is to be used. The outlet 9 can, for example, be adapted for connection directly to a Luer needle, or to a tubing leading to a Luer needle, as desired, and the fluid inlet 8 can then be connected to a liquid supply container of the type used in medicinal applications.

Figure 3:
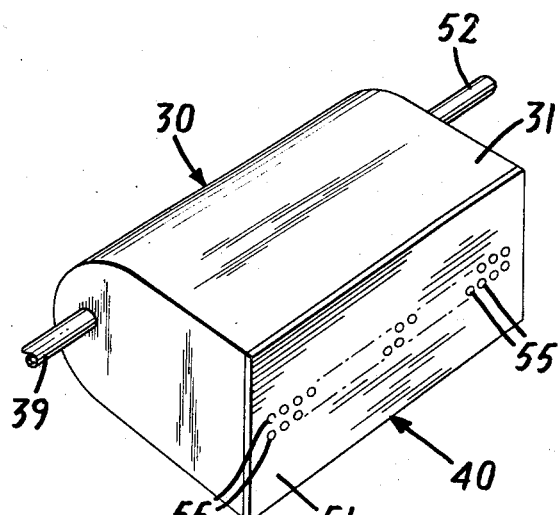
FIG. 3 is a cross-sectional view of another embodiment of gas separator in accordance with the invention, in which the chamber is arranged in a U-shape, and a gas vent is at the center of the U.
Figure 4:
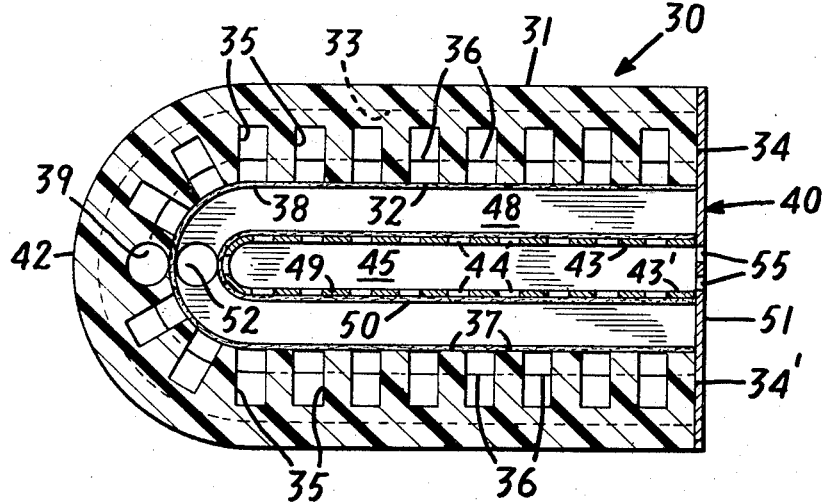
FIG. 4 is a perspective view of the separator of FIG. 3.

The gas separator of FIGS. 3 and 4 has two U-shaped nesting housing halves that are bonded together by a solvent-produced seal, thus dispensing with the nuts and bolts used in the device of FIGS. 1 and 2. The first housing U-half 30 is formed of transparent polymethyl methacrylate resin, with a smooth outer surface 31 and an inner surface 32 that is provided with a plurality of deep grooves 33 running lengthwise of the U, from the end of one leg 34 to the end of the other leg 34', disposed beneath a plurality of shallower grooves 35, running crosswise of the U, at the surface thereof, that are interconnected with the longitudinal grooves for liquid flow therethrough at their crossing points 36. Attached to the half 30 at the tops 37 of the raised portions between cross groves is a liquid-wetted filter material 38. This material is the same as that of FIGS. 1 and 2. Entering the lonigtudinal grooves 33, and disposed at the base 42 of the U, is a liquid outlet 39. This connects the base 42 with the longitudinally extending grooves 33, and thus a fluid path is formed from the filter 38 via the crosswise grooves 35 through crossings 36 into the longitudinal grooves 33 leading to the fluid outlet 39.

The second and inner housing U-half 40 is in a nesting U-shape, with a T-piece 51 crossing both legs of the U-half 30, and fused thereto, thus sealing U-half 40 to the outer housing U-half 30, and closing off the ends of the longitudinal grooves 33. The legs 43, 43' of the inner housing U-half 40 are quite close together, with an open space 45 therebetween, and are provided with a plurality of holes 44, through which a gas can pass into the space 45. Attached to the inner face of housing U-half 40, at the solid portions 49 between the holes 44, is a liquid-repellent filter material 50. This material is the same as of FIGS. 1 and 2. The legs 43, 43' of the U-half 40 are bridged by the T-piece 51, which at its inner face is bonded to the legs 34, 34' of U-half 30.

The T-piece 51 is formed with a plurality of holes 55 at its center which serve to vent gas collected in the space 45 to the atmosphere. When the T-piece is bonded in place to the legs 34, 34' of housing U-half 30, the liquid-repellent filter material 50 is thereby held in a position spaced from and parallel to the liquid-wetted filter material 38 attached to the raised portions between crosswise grooves 35 of the housing U-half 30, defining therebetween the chamber 48. The spacing between the filters 38, 50 can be for instance 0.5 to 2 mm. The chamber 48 thus defined has opposed parallel walls made up of the liquid-repellent and liquid-wetted filter materials 38, 50, both in a U-shape. In the base 49 of the housing U-half 40 is a fluid inlet 52, communicating with the chamber 48 between two filter materials 38, 50.

In use, fluid containing liquid and gas enters the device via the fluid inlet 52, thus entering the chamber 48 between the liquid-repellent and liquid-wetted filter materials. The liquid quickly wets the liquid-wetted material 38, and after the pores therein are all filled, thus material becomes impenetrable to gas, while liquid passes freely therethrough, into the crosswise grooves 35 and then through crossings 36 into the lengthwise grooves 33, running therethrough to the liquid outlet 39, whence liquid is delivered from the device, quite free from gas. Gas which cannot pass through the liquid-wetted material 38 reaches the liquid-repellent material 50, passes through it into the space 45 between the legs 43, 43' of the outer housing U-half 40, and is vented thence via the holes 55 to the atmosphere.

The gas separator of FIGS. 5 and 6 has a tubular housing 60 the open ends of which are closed off by flanged end caps 61, 62. The housing 60 is shown as closed, but it also can be perforated, to vent the gas that is separated by the device to the atmosphere if desired. Each end cap has a recessed portion 63, at the center, engaging and centering within the housing a core tube 65 extending from end to end of the housing. This core limits the hold up volume in annular chamber 66, of which the core serves as the internal wall. At one end of chamber 66 is disposed outlet tube 67. The external wall of the chamber 66 is defined by a concentric stainless steel wire mesh tube 68, which also extends from end to end of the housing 60, and has its ends seated in the recessed grooves 69, in the end caps 61, 62, thus locating it concentrically with respect to the core. The mesh serves as a support for a corrugated hydrophilic or liquid-wetted tubular filter material 71. This material is of the membrane type, made of an acrylonitrile-vinyl chloride copolymer, cast on a nylon fabric support, and having a mean pore size of 0.45 micron and a thickness of 140 microns.

The filter 71 serves as the internal wall of an annular chamber 72, which is 1 to 25 mm. wide. At one end of chamber 72 is a fluid inlet tube 73. The opposite wall of the chamber is defined by a corrugated tubular hydrophobic or liquid-repellent filter material 74, which is supported on a perforated stainless steel tube 75. This material is also of the membrane type, with a polytetrafluoroethylene membrane, mean pore size 0.5 micron, on a polyvinyl chloride fabric, and a thickness of 125 microns. The filter tube 74 and perforated tube 75 extend from end to end of the housing, and their ends are located in recessed grooves 76, in the end caps 61, 62, which space them concentrically with respect to the other elements of the device. On the outer side of the tube 75 is an annular chamber 78, from one end of which leads the outlet tube 79.

The ends of the core 65, and tubes 68, 71, 74 and 75 are bonded to the inner face of the end caps 61, 62 by a layer of epoxy resin, forming a fluid-tight seal there.

In use, fluid containing gas and liquid enters the device via inlet 73, entering the chamber 72. The liquid quickly wets and saturates the liquid-wetted filter 71, and from that time blocks the passage of gas therethrough. The liquid passing through the filter 72 and mesh tube 68 enters chamber 66, and leaves the device via outlet tube 67, free from gas.

The hydrophobic or liquid-repellent filter material 74 blocks the entry of liquid, but is open to passage of gas. Gas passing through the filter 74 and tube 75 enters chamber 78, and leaves the device via outlet tube 79, free from liquid.

The gas separator of FIGS. 7, 8 and 9 has a cylindrical shape, to fit an arm or leg of the human body. The housing 80 is in two parts, 81, 82, with part 82 having a central recessed portion 83 in which a projecting portion 84 of part 81 nests. The two parts are solvent-fused together.

The recessed portion 83 of part 82 has a plurality of through holes 85 which serve as gas vents, and in the recessed portion is disposed a hydrophobic filter material 86 of the type of FIGS. 1 and 2. This filter 86 is held at its periphery in the bite between housing parts 81, 82, and is solvent-bonded thereto in a leak-tight seal.

Housing part 81 has a bore 87 open to the exterior at 88 and serving as a liquid outlet, and a bore 89 open to the exterior at 90 and serving as a fluid inlet. A plurality of cross grooves 91 are provided at the inner face 92 of part 81 and intersect bore 87 at crossing points 93, for liquid flow via the grooves to the outlet 88. To the face 92 of the part 81 across the grooves 91 is bonded a hydrophilic filter material 94 of the type of FIGS. 1 and 2. This is done before assembly of part 81 to part 82. In the assembly, filters 86, 94 are parallel, and can be from 0.5 to 5 mm. apart, defining a chamber 95 therebetween, into which opens bore 89. The filters 86, 94 extend over the arc of a circle conforming to the curved configuration of housing parts 81, 92, and the radius of curvature of the arc and the length of the filter elements are such that the curved portion is higher than the spacing between the filters defining the chamber.

In use, fluid containing gas and liquid enters the separator at inlet 90, and flows through bore 89 into chamber 95. Liquid passes through hydrophilic filter 94, grooves 91, crossing points 93 into bore 87, and leaves the separator at outlet 88. Gas cannot pass through the filter 94, but it does pass through hydrophobic filter 86, which in turn blocks the liquid. Gas enters the holes 85, and is vented thereby to the atmosphere.

This device can easily be strapped or otherwise attached to the limb of a patient for use in administration of some fluid medicament.

The gas separators shown in the drawings as described above are useful to separate gases from liquids in any type of medicinal and chemical application. They can, for instance, be used both to clear a line of air and to prevent the introduction of air into a patient receiving an injection of any type of fluid medicament, such as a parenteral fluid, blood transfusions, blood plasma, intravenous feeding solutions, and the like. Such fluids can be delivered to a patient under gravity pressure, or under higher pressures, such as are encountered when the fluid delivery is effected by means of a syringe pump, and will prevent the introduction of air into the patient, at all pressures below the bubble point of the liquid-wetted filter material that is used, both at the beginning of the introduction of the liquid, even when the line before the separator contains air, and after delivery of fluid has exhausted the supply.

The devices are also useful in the gravity-free separation of gases and liquids, such as in outer space, beyond the influence of earth gravity, and they can be used to remove gases from the liquids entraining them, in any type of chemical process, such as in the separation of hydrogen and other reactive gases from liquids, in hydrogenation and other gas-reactant reactions. Because they require no electric power or other source of power, they are more versatile than centrifugal separators, and because of their small, compact size, they are usually better suited for the purpose.

The gas separators of the invention are also useful in the separation of liquids entrained in gases, provided the liquid-wetted filter material is fully wetted with the liquid being separated before operation is begun, so as to ensure that gas is not emitted through the liquid-wetted line. However, if the presence of gas in this line is no problem, then, of course, this expedient can be dispensed with. It such uses, the liquid-repellent filter material will ensure that the liquid is removed from the gas, and that liquid-free gas is obtained. Such devices are useful in air purifiers, and also in chemical plants where the entrainment of liquids in the stack gases must be prevented, so as to avoid pollution of the atmosphere and damage to the surrounding countryside. In these uses, the devices of the invention are better suited than electrostatic precipitators, since they require no external power.

Having regard to the foregoing disclosure, the following is claimed as the inventive and patentable embodiments thereof:

1. A gas separator caapble of separating gases and liquids and of venting the gas, comprising, in combination, a housing having liquid-and gas-impervious exterior walls defining a chamber within the housing, of which chamber a first wall comprises a first filter material that is wetted by a liquid to be passed through the housing but when so wetted will not pass a gas, and a second wall opposite the first comprises a second filter material that is not wetted by the liquid but will pass a gas entering the chamber, said second filter material being sufficiently closely spaced from the first filter material that gas will reach and pass through the second filter material in any position of the separator; an inlet in the housing between said first and said second filters for delivering to the chamber between the two opposite filter matreials a fluid comprising a gas and liquid; a liquid outlet in the housing on the other side of the first wall of the chamber, so that liquid entering the chamber must pass through the first filter to reach a liquid outlet; and a gas outlet in the housing on the other side of second wall of the chamber, so that all gas entering the chamber must pass through the second filter material to reach the gas outlet.

2. A gas separator according to claim 1, wherein the liquid-wetted and the liquid-repellent materials have an average pore size less than about 0.3 micron.

3. A gas separator according to claim 1 wherein the housing and associated parts of the separator are made of plastic.

4. A gas separator according to claim 1 wherein the plastic parts are bonded or fused together in a one piece construction.

5. A gas separator according to claim 1, in which the two filter walls are parallel.

6. A gas separator capable of separating gases and liquids and of venting the gas, comprising, in combination, a housing, outer, intermediate and inner concentric chambers in the housing; separated by concentric internal walls, of which walls one comprises a filter material that is wetted by a liquid to be passed through the housing, and another wall comprises a liquid-repellent filter material that is not wetted by the liquid to be passed through the housing; an inlet in the housing for delivering fluid comprising gas and liquid to the intermediate annular chamber between the liquid wetted and liquid-repellent filter materials; a liquid outlet in the housing on the opposite side of the liquid-wetted material; and a gas outlet in the housing on the opposite side of the liquid-repellent material.

7. A gas separator capable of separating gases and liquids and of venting the gas, comprising, in combination, a housing; a chamber in the housing, of which chamber one wall comprises a filter material that is wetted by a liquid to be passed through the housing, and another wall opposite the first and spaced less than 5 mm. therefrom comprises a liquid-repellent filter material that is not wetted by the liquid to be passed through the housing; an inlet in the housing for delivering fluid comprising gas and liquid to the chamber between the liquid-wetted and liquid-repellent filter materials; a liquid outlet in the housing on the opposite side of the liquid-wetted material; and a gas outlet in the housing on the opposite side of the liquid-repellent material.

8. A gas separator according to claim 7, wherein at least one of the filter materials is a microporous membrane filter.

9. A gas separator according to claim 7, wherein at least one of the filter materials comprises a porous substrate coated or impregnated with a microporous fibrous layer.

10. A gas separator according to claim 7 wherein at least one of the filter materials is supported on a foraminous sheet support.

11. A small gas separator capable of separating gases and liquids and of venting the gas, comprising, in combination, a housing; a chamber in the housing having a volume of less than 1 cc., of which chamber one wall comprises a filter material that is wetted by a liquid to be passed through the housing, and another wall comprises a liquid-repellent filter material that is not wetted by the liquid to be passed through the housing; an inlet in the housing for delivering fluid comprising gas and liquid to the chamber between the liquid-wetted and liquid-repellent filter materials; a liquid outlet in the housing on the opposite side of the liquid-wetted material; and a gas outlet in the housing on the opposite side of the liquid-repellent material.

12. A gas separator capable of separating gases and liquids and of venting the gas, comprising, in combination, a housing in three parts, comprising an annulus having a fluid inlet in one wall thereof, and intermediate and attached in a fluid tight seal to two outer portions, a gas outlet, in one outer portion and a liquid outlet in the other outer portion a chamber in the housing, of which chamber one wall comprises a filter material that is wetted by a liquid to be passed through the housing, and another wall opposite the first and relatively closely spaced therefrom comprises a liquid repellent filter material that is not wetted by the liquid to be passed through the housing, the liquid-repellent filter material being disposed across the line of flow between the chamber and the gas outlet and the liquid-wetted material being disposed across the line of flow between the chamber and the liquid outlet, so that all fluid entering the chamber must pass through one of the filter materials to reach an outlet.

13. A gas separator capable of separating gases and liquids and of venting the gas, comprising, in combination, a housing having liquid-and gas-impervious exterior walls defining a chamber within the housing, of which chamber a first wall comprises a first filter material that is wetted by a liquid to be passed through the housing but when so wetted will not pass a gas, and a second wall opposite the first and relatively closely spaced therefrom comprises a second filter material that is not wetted by the liquid but will pass a gas entering the chamber, the first and second walls being curved, and extending over an arc of sufficient length so that the curved walls are higher than the space between the walls; an inlet in the housing between said first and said second filters for delivering to the chamber between the opposite filter materials a fluid comprising a gas and liquid; a liquid outlet in the housing on the other side of the first wall of the chamber, so that liquid entering the chamber must pass through the first filter material to reach a liquid outlet; and a gas outlet in the housing on the other side of the second wall of the chamber, so that all gas entering the chamber must pass through the second filter material to reach the gas outlet.

14. A gas separator in accordance with claim 13, in which the curved configuration extends over an arc of at least 120°.

15. A gas separator in accordance with claim 13, in which the liquid-wetted and liquid-repellent filter materials are arranged in a U-configuration.

16. A gas separator capable of separating gases and liquids and of venting the gas, comprising, in combination, a housing in two parts, in either of which is disposed a fluid inlet, in one of which is disposed a liquid outlet, and in the other of which is disposed a gas outlet; the housing having liquid-and gas-impervious exterior walls defining a chamber of the housing, of which chamber a first wall comprises a first filter material that is wetted by a liquid to be passed through the housing but when so wetted will not pass a gas, and a second wall opposite the first and relatively closely spaced therefrom comprises a second filter material that is not wetted by the liquid to be passed through the housing but will pass a gas entering a chamber; said second filter material being sufficiently closely spaced from the first filter material that gas will reach and pass through the second filter material in any position of the separator; said inlet being disposed in said housing between said first and said second filters for delivering to the chamber between the two opposite filter materials a fluid comprising a gas and liquid the liquid outlet being disposed on the other side of the first wall of the chamber and the gas outlet being disposed on the other side of the second wall of the chamber; the second liquid repellent filter material being disposed across the line of flow between the chamber and the gas outlet, and the first liquid-wetted filter material being disposed across the line of flow between the chamber and the liquid outlet, so that all fluid entering the chamber must pass through one of the filter materials to reach an outlet.

17. A gas separator capable of separating gases and liquids and of venting the gas, comprising, in combination, a housing in two parts, comprising an outer U-portion having an outlet therein and, disposed across the line of flow to the outlet, a filter material that is wetted by a liquid to be passed through the housing; and an inner nesting U-portion having an outlet therein and, disposed across the line of flow to the outlet, a liquid-repellent filter material that is not wetted by the liquid to be passed through the housing; the two housing portions being attached in a fluid-tight seal, and holding the two filter materials spaced apart, defining a chamber therebetween; and a fluid inlet entering the chamber and disposed in the outer U-portion of the housing.

18. A gas separator according to claim 17 wherein the liquid-repellent filter is disposed in the inner U-portion and the liquid-wetted filter is disposed in the outer U-portion.

19. A gas separator according to claim 17 wherein the inner nesting U-portion is in the form of a U with the outlet in the cross T between the U-legs.

20. A gas separator according to claim 17 wherein at least one of the housing portions has a surface facing the filter material that is channeled for fluid flow towards the outlet from the filter material.

21. A gas separator according to claim 20 wherein the channels are in the form of an intersecting grid of grooves extending generally crosswise and generally lengthwise of the housing portion.

22. A gas separator capable of separating gases and liquids and of venting the gas, comprising, in combination, a housing in two parts, comprising an outer U-portion having an outlet therein and, disposed across the line of flow to the outlet, a filter material that is wetted by the liquid to be passed through the housing, and an inner nesting portion having an outlet therein and, disposed across the line of flow to the outlet a liquid-repellent filter material that is not wetted by the liquid to be passed through the housing; the inner U-portion having the end of the U closed off by a T-wall extending there across, and also extending across and closing off the open end of the U of the outer U-portion, the two housing portions being attached in a fluid-tight seal and holding the two filter materials spaced apart, defining a chamber therebetween; and a fluid inlet entering the chamber and disposed in either housing portion.

References Cited

UNITED STATES PATENTS

| 2,741,595 | 4/1956 | Juda | 210—321 |
| 3,066,462 | 12/1962 | Yap et al. | 55—524 |
| 3,252,270 | 5/1966 | Pall et al. | 55—318 |
| 3,300,949 | 1/1967 | Smylie et al. | 55—35 |
| 3,306,459 | 2/1967 | Bush | 210—344 |
| 3,364,658 | 1/1968 | Walker | 55—171 |
| 3,388,803 | 6/1968 | Scott | 210—321 |

REUBEN FRIEDMAN, Primary Examiner

C. N. HART, Assistant Examiner

U.S. Cl. X.R.

55—318, 421